Patented Feb. 16, 1926.

1,573,697

UNITED STATES PATENT OFFICE.

HENRY C. FULLER, OF WASHINGTON, DISTRICT OF COLUMBIA.

DENATURED ALCOHOL.

No Drawing.    Application filed June 6, 1921.  Serial No. 475,478.

*To all whom it may concern:*

Be it known that I, HENRY C. FULLER, a citizen of the United States, residing at Washington, District of Columbia, have invented certain new and useful Improvements in Denatured Alcohol, of which the following is a specification.

My invention consists in adding to ethyl alcohol certain glycerin derivatives for the purpose of so denaturing the alcohol that it is no longer potable, while at the same time such denatured alcohol is suitable for use in preparing a variety of articles such as liniments, mouth washes, toilet waters, perfumes, hair tonics, bay rum and many liquid medicines such as fluid extracts, tinctures and other mixed medicines.

The advantage in glycerin derivatives of the kind described as denaturing agents is that a few special formulas may be used for a great variety of preparations. Under the existing practice, it is necessary to provide special formulas for almost every product, in which it is desired to use tax-free denatured alcohol. This is complicating the work of the Bureau of Internal Revenue and seriously interfering with the work of manufacturers of ethyl alcohol.

These difficulties, I largely overcome by my present invention.

The substances used by me for denaturing agents are derivatives of glycerin, known as chlorhydrins and halogen aliphatic acid derivatives of glycerin.

For example, I use 15 parts of glyceryl monochlorhydrin to 100 parts of 95% ethyl alcohol.

Or, as representative of the second class, I use 15 parts of monochloracetylmonoglyceride to 100 parts of 95% ethyl alcohol, or mixtures of the two classes of glycerine derivatives may be employed.

The proportions stated are given by way of example and may be varied to a considerable extent.

The thus treated alcohol is sufficiently denatured to be unfit for use as a beverage due to its unpleasant taste. Even in considerable dilution, the effect is such that when introduced into the mouth, the taker can not swallow it. The odor of these denaturants is comparatively mild and does not affect unpleasantly the aromatic substances and volatile oils which enter into the composition of the preparations listed above.

While these denaturing agents are sufficiently potent to make the alcohol non-potable, their physiological properties will not be detrimental to the alcohol preparation, which are usually employed in small quantities and often by first mixing with water. The actual quantity of the denaturing agent ingested or applied to the skin is accordingly very slight.

By my invention I provide a denatured alcohol which retains its solvent properties and its capacity for being compounded into preparations of the kind above described, and one which can be diluted with water without precipitation of the denaturing agent.

I claim:

1. Denatured alcohol comprising ethyl alcohol and a halogen containing ester of glycerine.

2. Denatured alcohol comprising ethyl alcohol and a chlorine containing ester of glycerine.

3. Denatured alcohol comprising ethyl alcohol and a halogen aliphatic acid ester of glycerine.

4. Denatured alcohol comprising ethyl alcohol and a chlorine aliphatic acid ester of glycerine.

5. Denatured alcohol comprising ethyl alcohol and a halogen acetic acid ester of glycerine.

6. Denatured alcohol comprising ethyl alcohol and a chloracetic acid ester of glycerine.

7. Denatured alcohol comprising ethyl alcohol and monochloraceticmonoglyceride.

8. Denatured alcohol comprising ethyl alcohol, monochloraceticmonoglyceride and glyceryl monochlorhydrin.

In testimony whereof, I affix my signature.

HENRY C. FULLER.